(12) United States Patent
Takagi et al.

(10) Patent No.: US 6,473,023 B1
(45) Date of Patent: Oct. 29, 2002

(54) REMOTE CONTROL DEVICE FOR ELECTRONIC EQUIPMENT

(75) Inventors: Noriaki Takagi, Saitama; Takayuki Kobayashi, Tokyo; Rumi Nakano; Takeshi Horie, both of Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 116 days.

(21) Appl. No.: 09/656,706

(22) Filed: Sep. 7, 2000

(30) Foreign Application Priority Data

Sep. 9, 1999  (JP) ............................................. 11-256347

(51) Int. Cl.$^7$ ............................................... G08C 19/12
(52) U.S. Cl. ........................ 341/176; 348/734; 359/142
(58) Field of Search ........................ 341/176; 348/734; 359/142, 146

(56) References Cited

U.S. PATENT DOCUMENTS 5,578,999 A * 11/1996 Matsuzawa et al. ........ 348/734
5,832,296 A   11/1998 Wang et al.
5,847,305 A   12/1998 Yoshikawa et al.
2002/0019229 A1 * 2/2002 Freeman et al. ............... 482/4

FOREIGN PATENT DOCUMENTS

DE           4430886        3/1996

* cited by examiner

Primary Examiner—Timothy Edwards, Jr.
(74) Attorney, Agent, or Firm—Sonnenschein, Nath & Rosenthal

(57) ABSTRACT

An electrical equipment to be acted on can be remote-controlled with enhanced convenience. A remote control device 1 includes a main body unit 2 having an actuating portion 4 for actuating the electrical equipment 10, an infrared light emitting portion 5 for radiating the infrared light for controlling the electrical equipment and a display unit 6 for demonstrating the information at least displaying the operating state of the electrical equipment. The remote control device 1 also includes a loading unit 3 connected to the main body unit 2 and which is adapted for being worn on or detached from the arm or the wrist of a user. A power source for furnishing the electric power to at least the actuating portion 4, light emitting portion 5 and the display unit 6 is provided within the interior of the loading unit 3.

10 Claims, 2 Drawing Sheets

REMOTE CONTROL DEVICE FOR ELECTRONIC EQUIPMENT

BACKGROUND OF THE INVENTION

RELATED APPLICATION DATA

The present application claims priority to Japanese Application No. P11-256347 filed Sep. 9, 1999, which application is incorporated herein by reference to the extent permitted by law.

1. Field of the Invention

This invention relates to a remote control device for an electronic equipment.

2. Description of Related Art

A remote control device for an electronic equipment is used for actuating a variety of electronic equipment, including, in particular, electronic equipment for household use, such as a television or a video tape recorder, from a remote place. The remote control device is used especially in a portable electrical equipment, such as a recording and/or reproducing device, by being connected partway in a connection cord interconnecting the headphone and a portable recording and/or reproducing apparatus. In this case, the cord interconnecting the recording and/or reproducing apparatus and the remote control device tends to hamper the action of the user. For overcoming this inconvenience, attempts are being made to provide for a wireless remote control device even in a portable recording and/or reproducing apparatus.

Meanwhile, if the above-described conventional remote control device is used to remote-control the portable recording and/or reproducing apparatus, as an actuated electrical equipment, the user wears the remote control device in an optional place such as a portion of the apparel, such as in a pocket or in a baggage.

However, if there is no place available for accommodating the remote control device, the user has to accommodate the remote control device itself in a pocket or in a baggage. In such case, when the electrical equipment needs to be operated, the user cannot operate the electrical equipment instantly. Moreover, it becomes necessary to search the remote control device before actuating the electrical equipment. The result is that the conventional remote control device cannot fulfill its inherent object of acting conveniently from a remote place on the controlled equipment, thus inconveniencing the user.

In addition, the conventional remote control device is in need of a power source for furnishing the power.

However, the remote control device, in need of a space in which to install the power source, is unable to meet the request for miniaturisation, thus tending to inconvenience the user.

SUMMARY OF THE INVENTION

It is therefore an object of the present invention to provide a remote control device for an electrical equipment, in which the electrical equipment can be remote-controlled with excellent convenience for the user.

In accordance with the present invention there is provided a remote control device for remote-controlling an electrical equipment including a main body unit having an actuating portion for actuating the electrical equipment, a light emitting portion for radiating the light for controlling the electrical equipment and a display unit for demonstrating the information at least displaying the operating state of the electrical equipment, and a loading unit connected to the main body unit and adapted for being worn on or detached from the arm or the wrist of a user. A power source for furnishing the electric power to at least the actuating portion, light emitting portion and the display unit is provided within the interior of the loading unit.

The remote control device for the electrical equipment according to the present invention is worn on the arm or on the wrist of the user and furnishes the power necessary for actuating at least the actuating portion, light emitting portion and the display portion, by the power source provided in the interior of the loading unit, to remote-control the electrical equipment.

The remote control device for the electrical equipment according to the present invention features using a polymer battery as a power source.

The remote control device for the electrical equipment according to the present invention includes a polymer battery, which is high in safety, lightweight and flexible, as a light source within the interior of the loading unit.

More specifically, the remote control device for an electrical equipment according to the present invention can be worn on the arm or wrist of the user and, by the power source provided within the interior of the loading unit for furnishing the power actuating at least the actuating portion, light emitting portion and the display portion, is able to remote-control the electrical equipment with improved convenience for the user.

Moreover, the remote control device for the electrical equipment according to the present invention uses the polymer battery as the power source.

Since the polymer battery, high in safety, lightweight and flexible, is mounted as a power source in the interior of the loading unit, the remote control device for the electrical equipment according to the present invention may be used with high convenience by the user.

DESCRIPTION OF THE PREFERRED EMBODIMENTS

Figure 1:
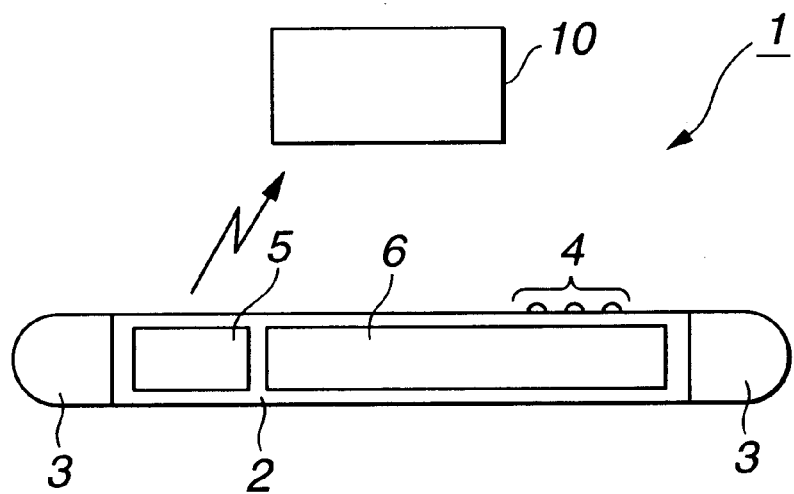
FIG. 1 is a front view showing a remote control device for an electrical equipment according to the present invention.
Figure 2:
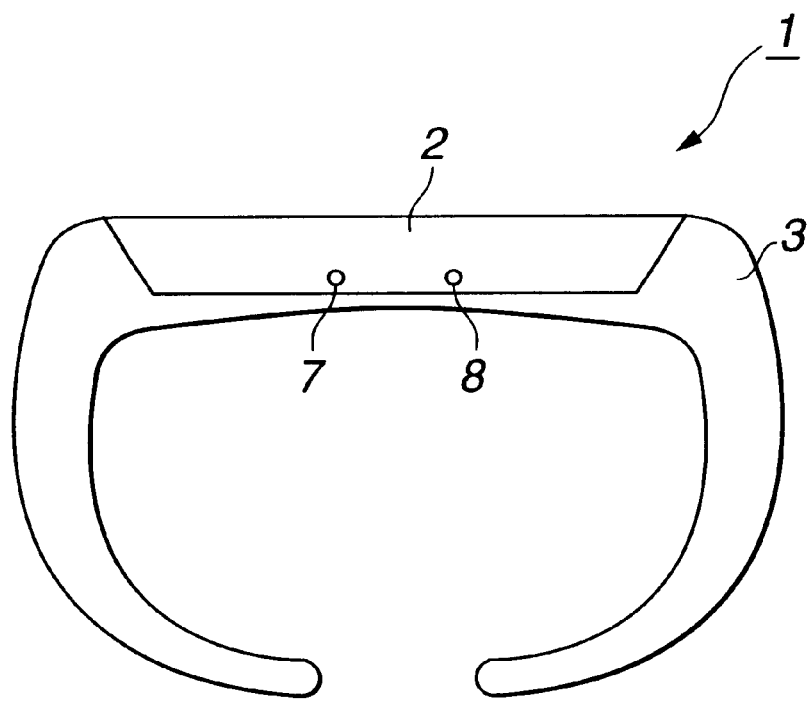
FIG. 2 is a side view showing a remote control device for an electrical equipment according to the present invention.
Figure 3:
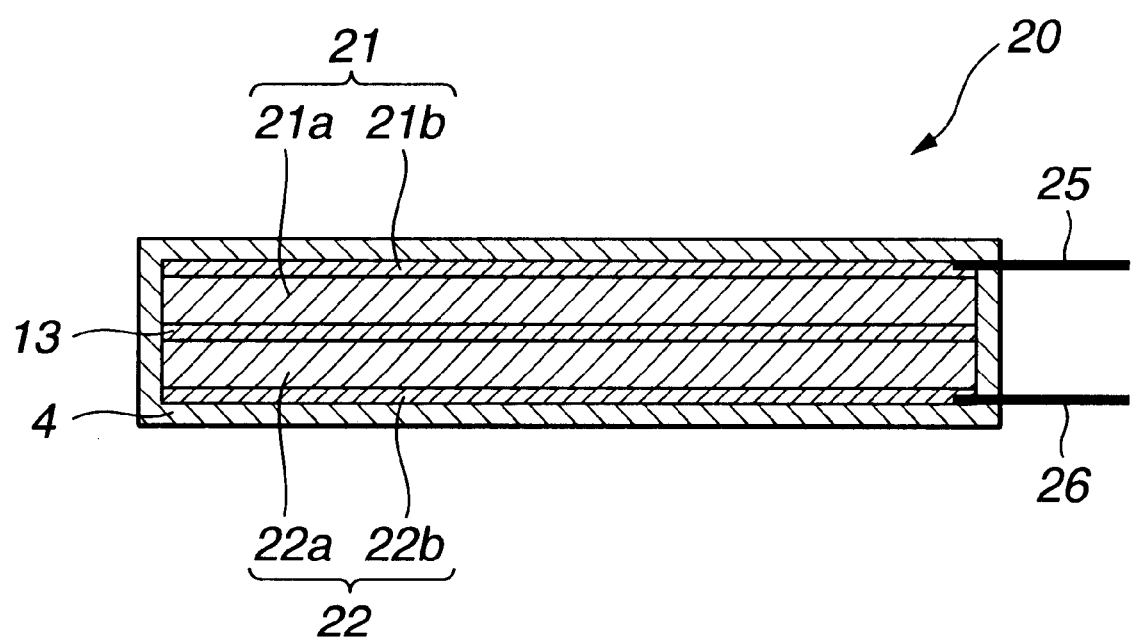
FIG. 3 is a schematic cross-sectional view showing essential portions of an illustrative structure of a polymer battery.

Referring to the drawings, preferred embodiments of a remote control device for an electrical equipment according to the present invention will be explained in detail. Referring to FIGS. 1 and 2, showing a specified structure of a remote control device 1, embodying the present invention, the remote control device 1 is used for remote-controlling an electrical equipment, such as a portable recording and/or reproducing apparatus for recording and/or reproducing picture data or music data on or from a recording medium.

The remote control device 1 includes a main body unit 2 and a loading unit 3 connected to this main body unit 2.

The main body unit 2 includes an actuating portion 4 for acting on an electrical equipment 10 being controlled, an IR light emitting portion 5 for emitting the IR light for controlling the electrical equipment 10 being controlled, a display portion 6 for demonstrating the operating state of the electrical equipment 10 being controlled, a controller, not shown, for controlling the components 4 to 6, an external negative terminal 7 and an external positive terminal 8.

The actuating portion 4 is used for acting on the electrical equipment 10 being controlled and may be provided with a key switch etc acted on by a user, such as a stop switch for stopping the operation of the electrical equipment 10 being controlled.

The IR light emitting portion 5 radiates an input signal corresponding to the actuating input performed by the user through the actuating portion 4, to transmit the radiated IR light to the electrical equipment 10 being controlled.

The display portion 6 is, for example, a liquid crystal display device, and demonstrates at least the picture information or the letter information, representing the operating state of the electrical equipment 10 being controlled, in a visible state. So, the user is able to confirm the operating state of the electrical equipment 10 being controlled through this display portion 6. On the other hand, the display portion 6 is able to display the additional information, such as time or temperature information, information pertinent to the operating contents of the main body unit 2, etc, as necessary.

The external negative terminal 7 and the external positive terminal 8 are used for connecting a polymer battery, as later explained, with a charger, not shown.

The main body portion 2 is in operation with its variable parts supervised by a controller, not shown.

The loading unit 3 is connected to the main body portion 2 and may be detachably fitted on the arm or the wrist of the user. That is, the loading unit 3 is a resilient member bent along the arm or the wrist of the user and having respective ends abutting on each other.

This remote control device 1 is of a unified structure having the main body portion 2 connected to a mid portion of the loading unit 3, and is of a substantially toroidal shape opened at one location. In use, the remote control device 1 is applied to the arm or to the wrist of the user, like a bracelet. So, the user may wear the remote control device 1 on his or her body portion so that he or she can instantly act on the electrical equipment 10 being controlled when the electrical equipment 10 is in need of actuation. On the other hand, it is possible to prevent inadvertent loss of the remote control device 1 due to carrying or leaving it in an improper place.

Moreover, since the remote control device 1 is formed of an elastic member having a substantially toroidally-shaped resilient member, the loading unit 3 is liable to be moved to and for when the user wears it on his or her arm or wrist. As a result, the user is able to perform the operation of loading or unloading the remote control device 1 readily and promptly.

Within the interior of the loading unit 3 of the remote control device 1, there is built-in a polymer battery 20, used as a power source for furnishing the power for actuating at least the aforementioned actuating portion 4, IR light emitting portion 5 and the display portion 6.

The polymer battery 20 is a non-aqueous electrolyte battery, or a so-called lithium ion secondary cell, and may, for example, be a completely solid electrolyte cell, a solid electrolyte cell or a gel-like electrolyte cell. Specifically, the polymer battery 20 includes a negative electrode 21, a positive electrolyte 22, arranged facing the negative electrode 21, and a high molecular solid electrolyte 23, arranged between the negative electrode 21 and the positive electrolyte 22, and is hermetically sealed by being covered by an external casing 24 of an insulating material. A negative electrode terminal 25 and a positive electrode terminal 26 are connected respectively to the negative electrode 21 and to the positive electrolyte 22 and are led out from the rim of the external casing 24 to outside the external casing 24 so as to be connected to necessary places of the remote control device 1.

The negative electrode 21 comprises a layer of a negative electrode active material 21a, containing a negative electrode active material, and a negative electrode current collector 21b, carrying a layer of a negative electrode active material 21a. This negative electrode current collector 21b may, for example, be a metal foil, such as a copper foil. There is no limitation to the negative electrode active material contained in the layer of a negative electrode active material 21a since it may differ with the kind of the cell to be produced. For example, in producing a lithium cell or a lithium ion cell, alloys containing metal lithium or alloys containing lithium metal, a carbonaceous material capable of occluding and emitting metal lithium and an inorganic material capable of occluding and emitting metal lithium.

The lithium alloys may be enumerated by lithium-aluminum alloys, lithium-zinc alloys, lithium-tin alloys, lithium-lead alloys and lithium-indium alloys.

The carbonaceous materials capable of occluding and emitting alkali metals, such as lithium, may be enumerated by, for example, electrically conductive polymers, such as polyacetylene polypyrrole, thermally decomposed carbons, cokes (pitch coke, needle coke or petroleum coke), graphites, non-graphitizable carbons, vitreous carbons, sintered organic high polymer compounds, obtained on firing an organic high polymer material at a suitable temperature not lower than 500° C. under vacuum or in an inorganic gas stream, carbon fibers and activated charcoal. Examples of the inorganic materials, capable of occluding and emitting lithium, include oxides, such as tin oxide, iron oxide or titanium oxide, siliceous materials or compounds thereof, and tin compounds. In producing negative electrodes from these materials, known binders, for example, may be added.

The positive terminal comprises a layer of a positive electrode active material 22a deposited on a positive electrode current collector 22b. As this positive electrode current collector 22b, a metal foil, such as, for example, an aluminum foil, is used. There is no particular limitation to the positive electrode active material since it differs from one sort of the cell produced to another.

For example, if a lithium cell or a lithium ion cell is to be produced, there is no limitation to the materials used, it being sufficient if a material used be capable of occluding and emitting lithium. For example, the positive electrode active material used may be of a metal oxide or sulfide, not containing lithium, such as $TiS_2$, $MoS_2$, $NbSe_2$ or $V_2O_5$, or a lithium transition metal compound oxide represented by the general formula of $LixMO_2$, where M denotes a transition metal, such as Co, Ni or Mn, with $0.05 \leq x \leq 1.10$, or the general formula of $LiNi_pM1_qM2_rO_2$ where M1 and M2 is at least one element selected from the group of Al, Mn, Fe, Co, Ni, Cr, Ti or Zn, and may also be non-metallic elements, such as P or B, with $p+q+1=1$, depending on the sort of the cell desired to be prepared. In particular, lithium cobalt oxides or lithium nickel oxides are preferred as the positive electrode active material, since these oxides yield high voltage and high energy density and are superior in cyclic characteristics.

In particular, these lithium transition metal compound oxides prove a positive electrode active material that is able to yield a high voltage and is superior in energy density. A plurality of sorts of the positive electrode active materials may be used in combination for the positive electrode. In preparing the positive electrode using the above-described positive electrode active materials, it is possible to add known electrifying agents or binders.

As the solid electrolyte, used in the polymer battery 20, it is possible to use a pure solid electrolyte completely free of solvents. As the pure solid electrolyte, free of solvents, high polymer solid electrolytes, employing an ion conductive high molecular material, or an inorganic solid electrolyte cell, employing ion conductive ceramics or an ion conductive glass, may be used.

For example, in forming a high molecular solid electrolyte, a high molecular compound material, obtained on dissolving an electrolyte in a high molecular matrix having an etheric bond, as exemplified by a polyethylene oxide, may be used. In this case, an electrolyte used in a routine cell electrolyte, may be used, such that lithium salts, exemplified by $LiPF_6$, $LiCl_4$, $LiAsF_6$, $LiCF_3SO_3$, $LiN(CF_3SO_2)_2$, $LiC(CF_3SO_2)_3$, $LiAlCl_4$ or $LiSiF_6$, may be used.

As the high molecular matrix, not only straight-chained high molecular materials, such as polyethylene oxides, but a comb-shape high molecular material having a side chain structure, or a high molecular material having an inorganic high molecular structure, such as a siloxane or polyphosphasen structure, in its main chain, may be used without limitations.

Alternatively, routine solid electrolyte cells or gel electrolyte cells may be used. If a solid electrolyte cell or a gel electrolyte cell is taken into consideration, the high molecular material used for the high molecular solid electrolyte 23 may be silicon gel, acrylic gel, acrylonitrile gel, polyphosphasen modified polymer, polyethylene oxide, polypropylene oxide, and compound, cross-linked or modified polymers thereof. In addition, poly(vinylidene fluoride) or poly (vinylidene fluoride-co-hexafluoropropylene), poly (vinylidene fluoride-co-tetrafluoroethylene), poly (vinylidene fluoride-co-trifluoroethylene) and mixtures thereof may be used without limitations.

The solid electrolyte or the gel electrolyte, layered on the layer of a negative electrode active material 21a or on the layer of a positive electrode active material 22a, is obtained on impregnating the layer of a negative electrode active material 21a or the layer of a positive electrode active material 22a with a solution composed of a high molecular compound, an electrolyte salt and a solvent, removing the solvent and solidifying the remaining product. It is noted that the solvent may also contain a plasticizer if the electrolyte is gel electrolyte. The solid electrolyte or the gel electrolyte, layered on the layer of a negative electrode active material 21a or on the layer of a positive electrode active material 22a, has its portion impregnated with the negative electrode active material or the positive electrode active material and solidified. If the solid electrolyte or gel electrolyte is cross-linked, it is solidified on cross-linking with light or heat.

The gel electrolyte is composed of a plasticizer containing a lithium salt, and 2 to 30 wt % or less of a high polymer matrix. It is noted that esters, ethers, ester carbonates etc may be used alone or as a component of the plasticizer.

In preparing a gel electrolyte, a variety of high molecular materials, used for constituting the gel electrolyte, may be used as a matrix high polymer gelating these esters carbonates. For stability in oxidation/reduction, it is desirable to use fluorine-based high molecular materials, such as poly (vinylidene fluoride) or poly (vinylidene fluoride-co-hexafluoropropylene).

The high molecular solid electrolyte 23 is composed of a lithium salt and a high molecular compound dissolving the lithium salt. For the high molecular compound, ether-based high molecular materials, such as poly (ethylene oxide) or cross-linked products thereof, or fluorine-based high molecular materials, such as poly(methacrylate) esters, acrylates, poly (vinylidene fluoride) or poly (vinylidene fluoride-co-hexafluoropropylene), may be used alone or in combination. For redox stability, fluorine-based high molecular materials, such as poly (vinylidene fluoride) or poly (vinylidene fluoride-co-hexafluoropropylene), may preferably be used.

There is no particular limitation to the lithium salt provided that the electrolyte salt itself is dissolved in the polyether copolymer to exhibit ionic conductivity. For example, hitherto known lithium salts, such as lithium hexafluorophosphate ($LiPF_6$), lithium perchlorate ($LiClO_4$), lithium hexafluoroarsenate ($LiAsF_6$), lithium tetrafluoroborate ($LiBF_4$), trifluoromethyl sulfonyl lithium ($LiCF_3SO_3$) or bis-trifluoromethyl sulfonyl imide lithium ($[LiN(CF_3SO_2)_2]$, may be used, either alone or as a mixture.

As discussed above, the remote control device 1 may be reduced in size by providing the polymer battery 20 as a power source in the interior of the loading unit 3, where there is a certain space tolerance, since there is no necessity of newly providing a space in which to install the power source.

On the other hand, if the polymer battery 20 is used as the power source for the remote control device 1, there is no risk of liquid leakage, thus realizing safety higher than in the case of using a cell employing the liquid electrolyte.

In addition, since the polymer battery 20 is not in need of a liquid electrolyte, the cell casing of a simpler structure than in the case of a cell having liquid electrolyte, suffices, so that the cell casing for the polymer battery 20 may be lightweight and flexible. Therefore, the remote control device 1 may use the polymer battery 20 without any problems even with the loading unit 3 required to be flexible. Moreover, since the polymer battery 20 is lightweight, the user of the remote control device 1 may wear the remote control device 1 with only little extraneous feeling.

It is meritorious to have the polymer battery 20 housed in the loading unit 3 even in light of the performance of the polymer battery 20 itself. The polymer battery 20 in general is low in low temperature characteristics, such that a sufficient performance cannot be displayed at a lower temperature. However, if the polymer battery 20 is housed in the loading unit 3, the body temperature of the user is transmitted to the polymer battery 20 to contribute to a more efficient operation.

With the remote control device 1, as described above, loaded on the arm or on the wrist of the user, the electrical equipment 10 to be controlled can be actuated instantly when the electrical equipment 10 needs to be actuated. On the other hand, the remote control device 1 can be reduced in size by providing the power source within the loading unit 3. By using the polymer battery 20 as the power source, the remote control device 1 can be used with a highly convenient using feeling by the user. That is, the remote control device 1 can remote-control the electrical equipment 10 with a highly convenient feeling on the part of the user.

The present invention is not limited to the above-described embodiment. For example, the loading unit 3 is not limited to the bracelet type, on the condition that the loading unit has the power source for the remote control device 1 in the interior thereof and is of a flexible structure. Thus, the loading unit 3 may be band-shaped, like a wristwatch band, or in the form of a metal chain.

The present invention is not limited to the portable recording and/or reproducing apparatus as the electrical equipment 10 to be controlled and may be applied to any equipment in need of an actuating input from outside.

What is claimed is:

1. A remote control device for remote-controlling an electrical device, comprising:
    a main body unit having an actuating portion for actuating said electrical device, a light emitting portion for radiating the light for controlling said electrical device and a display unit for displaying information characterizing an operating state of said device equipment; and
    a loading unit connected to said main body unit and constructed such that it can be carried on an appendage of a user;
    characterized in that
    a power source for furnishing the electric power to at least said actuating portion, light emitting portion and the display unit is provided within the interior of said loading unit, said power source including positive and negative electrode contacts that are exposed on a surface of the main body unit to allow electrical connection to a power source external to the main body unit.

2. The remote control device according to claim 1 wherein said power source is a polymer battery.

3. The remote control device according to claim 1 wherein said loading unit is bent to follow the arm or the wrist of the user and has its ends contacting each other.

4. The remote control device according to claim 2 wherein said polymer battery includes a positive electrode, a negative electrode and a high-molecular solid electrolyte.

5. The remote control device according to claim 4 wherein a positive electrode active material contained in said positive electrode is a material capable of occluding and emitting lithium.

6. The remote control device according to claim 5 wherein said positive electrode active material is one of $TiS_2$, $MoS_2$, $NbSe_2$, $V_2O_5$ and $Li_xMO_2$, where M denotes a transition metal and $0.05<x<1.10$.

7. The remote control device according to claim 4 wherein said negative electrode active material contained in said negative electrode is one of metal lithium, a lithium metal containing alloy, a carbonaceous material and an inorganic material.

8. The remote control device according to claim 7 wherein said carbonaceous material is one of electrically conductive polymers, thermally decomposable carbon, coke, graphite, non-graphitizable carbon, vitreous carbon and a sintered organic high molecular compound.

9. The remote control device of claim 1, wherein the device is a bracelet worn by the user.

10. The remote control device of claim 1, wherein the device is worn on the wrist by the user.

* * * * *